(12) United States Patent
Chan et al.

(10) Patent No.: US 6,527,457 B2
(45) Date of Patent: Mar. 4, 2003

(54) OPTICAL FIBER GUIDE MODULE AND A METHOD FOR MAKING THE SAME

(75) Inventors: Benson Chan, Vestal, NY (US);
Richard R. Hall, Endwell, NY (US);
How T. Lin, Vestal, NY (US); John H. Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/775,725

(22) Filed: Feb. 1, 2001

(65) Prior Publication Data

US 2002/0102072 A1 Aug. 1, 2002

(51) Int. Cl.[7] .................................................. G02B 6/36
(52) U.S. Cl. ...................................................... 385/89
(58) Field of Search ............................... 385/88, 89, 92

(56) References Cited

U.S. PATENT DOCUMENTS

| | | | |
|---|---|---|---|
| 5,420,954 A | 5/1995 | Swirhun et al. .............. 385/92 |
| 5,428,704 A | 6/1995 | Lebby et al. .................. 385/92 |
| 5,499,311 A | 3/1996 | DeCusatis ..................... 385/89 |
| 5,515,467 A | 5/1996 | Webb ............................ 385/88 |
| 5,590,232 A | 12/1996 | Wentworth et al. ........... 385/92 |
| 5,611,013 A | 3/1997 | Curzio .......................... 385/89 |
| 5,631,988 A | 5/1997 | Swirhun et al. .............. 385/89 |
| 5,774,614 A | 6/1998 | Gilliland et al. .............. 385/88 |
| 5,778,123 A | 7/1998 | Hagan et al. .................. 385/76 |
| 5,781,682 A | 7/1998 | Cohen et al. .................. 385/89 |
| 5,790,733 A | 8/1998 | Smith et al. ................... 385/88 |
| 5,940,562 A | 8/1999 | Henson et al. ................ 385/88 |
| 6,056,448 A | 5/2000 | Sauter et al. .................. 385/92 |
| 6,234,687 B1 * | 5/2001 | Hall et al. ..................... 385/88 |

* cited by examiner

*Primary Examiner*—Tulsidas Patel
(74) *Attorney, Agent, or Firm*—Whitham, Curtis & Christofferson, P.C.; Lawrence R. Fraley

(57) ABSTRACT

An optical fiber guide includes a matrix of holes integrated directly into a substrate on which one or more optical chips are mounted. The substrate therefore functions both as a guide for optically coupling a plurality of optical fibers to an optical chip, as well as a carrier for the optical chip itself. The size of the fiber guide and its integration density is therefore improved over conventional fiber connectors. The substrate is preferably made of a material having a coefficient of thermal expansion substantially similar to the coefficient of thermal expansion of the optical chip. This ensures that the optical fibers will remain optically coupled to the chip through the matrix of holes in the substrate regardless of external temperature influences. If desired, integrated circuits may be mounted onto the substrate to increase the functionality of the fiber guide. A method for making the fiber guide has fewer process steps than conventional methods because fiber guide has fewer parts than conventional fiber-optic connectors.

18 Claims, 6 Drawing Sheets

OPTICAL FIBER GUIDE MODULE AND A METHOD FOR MAKING THE SAME

BACKGROUND OF THE INVENTION

1. Field of the Invention.

This invention generally relates to optical connectors, and more particularly to an optical fiber guide module for aligning one or more fibers to an optical or opto-electronic chip and a method for making an optical fiber guide module of this type.

2. Description of the Related Art.

Because of their high transmission speeds and wide bandwidth, fiber-optics has become the preferred technology in communications networks, both domestically and abroad. The switch to this technology has necessitated an upgrade in the connectors which optically couple signal fibers to other elements of a system. For example, it has become the recent trend to replace electronic integrated circuits with optical or opto-electronic chips. This replacement has not only increased signal transmission and processing speeds, but also has increased integration density.

U.S. Pat. No. 5,631,988 to Swirhun discloses a conventional fiber-optic connector. This connector includes an element (often referred to as a block or a holder) for securing an array of optical fibers. The holder is mounted on a substrate using mechanical alignment pins. A connection is then established between the fibers and circuitry on the substrate to complete the assembly. U.S. Pat. Nos. 6,056,448, 5,590,232, and 5,420,954 disclose similar connectors.

Conventional connectors of the aforementioned type have proven inefficient in a number of ways. First, their size has frustrated attempts towards miniaturization. This is attributable mainly to their use of an optical-fiber holder as an element separate from the substrate. The optical-fiber holder also limits the number of connections to the substrate, and the use of mechanical pins to align the holder with the substrate has also increased size.

Other known connectors attach an optical fiber to an optical chip via a separate flexible substrate. U.S. Pat. No. 5,774,614 discloses a connector of this type. One of the main disadvantages of this connector is that the flexible substrate adds to the size of the connector, thereby preventing miniaturization. This connector is also undesirable because automatic alignment machinery must be used to align the chip with the fiber.

In view of the foregoing considerations, it is clear that conventional fiber-optic connectors are too large, too expensive, and require far too many process steps for their manufacture. In order to meet the ever-increasing demand for smaller and faster optical systems, optical connectors must be improved in terms of their size, speed, and performance.

A need therefore exists for a connector, or connector module, which couples optical fibers to one or more optical or opto-electronic chips using fewer parts than conventional connectors, while at the same time increasing the number of fiber connections. Such a module will have increased integration density and functionality, thereby increasing the size and signal transmission speed of the optical systems into which they are incorporated.

SUMMARY OF THE INVENTION

It is a first object of the present invention to provide an optical fiber guide module which is smaller in size, achieves a greater number of fiber-optic connections, and thus has improved integration density over conventional connectors.

It is another object of the present invention to achieve the first object by integrating an optical-fiber holder of the guide directly into the substrate on which one or more optical or opto-electronic driver chips, amplifiers, and modulator chips are mounted, and more specifically by eliminating the use of a holder as an element separate from the substrate, thereby allowing the fiber guide of the invention to achieve a size which is substantially smaller than conventional connectors.

It is another object of the present invention to provide an optical fiber guide of the aforementioned type which connects a greater number of optical fibers than are connected by conventional connectors, which have only a limited number of connections as a result of their use of an optical-fiber holder.

It is another object of the present invention to provide an optical fiber guide module which optically couples optical fibers to one or more optical chips using flip-chip technology, thereby eliminating the need for mechanical alignment pins and thus further increasing integration density and the ability to miniaturize the overall optical system.

It is another object of the present invention to provide an optical fiber guide which includes a substrate made of a material with a coefficient of thermal expansion the same or similar to that of the optical chip, thereby ensuring that the optical fibers and optical chip remain in alignment regardless of temperature variations or other external thermal influences.

It is another object of the invention to provide an optical fiber guide which attaches an optical chip directly to a multi-functional ceramic substrate, thereby removing the need to use automatic machinery to align the chip and fibers, and instead using far more efficient flip-chip solder techniques for this purpose. Attaching the optical chip directly to a multi-functional substrate also promotes miniaturization, a goal which is frustrated by many conventional designs which mount the optical chips to be connected to a separate substrate or printed circuit board. This direct-attach design improves performance with respect to speed, power efficiency, and noise.

It is another object of the present invention to provide a method for making an optical fiber guide using fewer steps than required by conventional methods.

The foregoing and other objects of the invention are achieved by providing a fiber guide which functions as an optical-fiber holder integrated directly into a substrate on which an optical chip is mounted. This is achieved by forming one or more holes in the substrate either by lithography or molding techniques. Preferably, the substrate has a multi-dimensional matrix of holes to thereby maximize the integration density and number of connections sustainable by the fiber guide. The substrate, thus, functions both as a guide for the optical fibers as well as a carrier for the optical chip.

To reduce the need for alignment pins, the fiber guide of the invention uses, in accordance with one embodiment, flip-chip soldering techniques to mount the chip onto the substrate at a position where the optical receivers and/or transmitters of the chip are aligned with the optical fibers. Flip-chip techniques are especially desirable when the optical chip has multiple light transmitting and receiving ports, since the surface tension between the solder bumps on the optical chip and substrate will bring these optical devices into alignment with the matrix of holes. Alternately, a conductive adhesive may be used to connect the optical chip to the substrate.

Preferably, the substrate is made of a material having a coefficient of thermal expansion which is substantially similar to the coefficient of thermal expansion of the optical chip. This will advantageously allow the chip and substrate to expand and contract in unison, thereby preserving optical coupling between the fibers and optical chip regardless of external temperature influences. The integration density of the modularized fiber guide junction of the invention may be further enhanced by mounting one or more integrated chips onto the substrate. The back of the substrate may be equipped with metallic alignment pads for attachment to a board, card, module, or other circuit connections. To further increase the functionality of the invention, the substrate may be equipped with one or more guide holes for connecting power and/or ground lines to the optical chip.

The method of the present invention has fewer process steps than conventional methods because the optical fiber guide of the invention as comparatively fewer parts. This method includes forming one or more holes in a substrate, mounting an optical chip on a first side of the substrate at a position which aligns an optical receiver and/or transmitter of the chip with the hole or holes in the substrate, and connecting one or more optical fibers to the hole or holes in the substrate.

DESCRIPTION OF THE PREFERRED EMBODIMENTS

Figure 1:
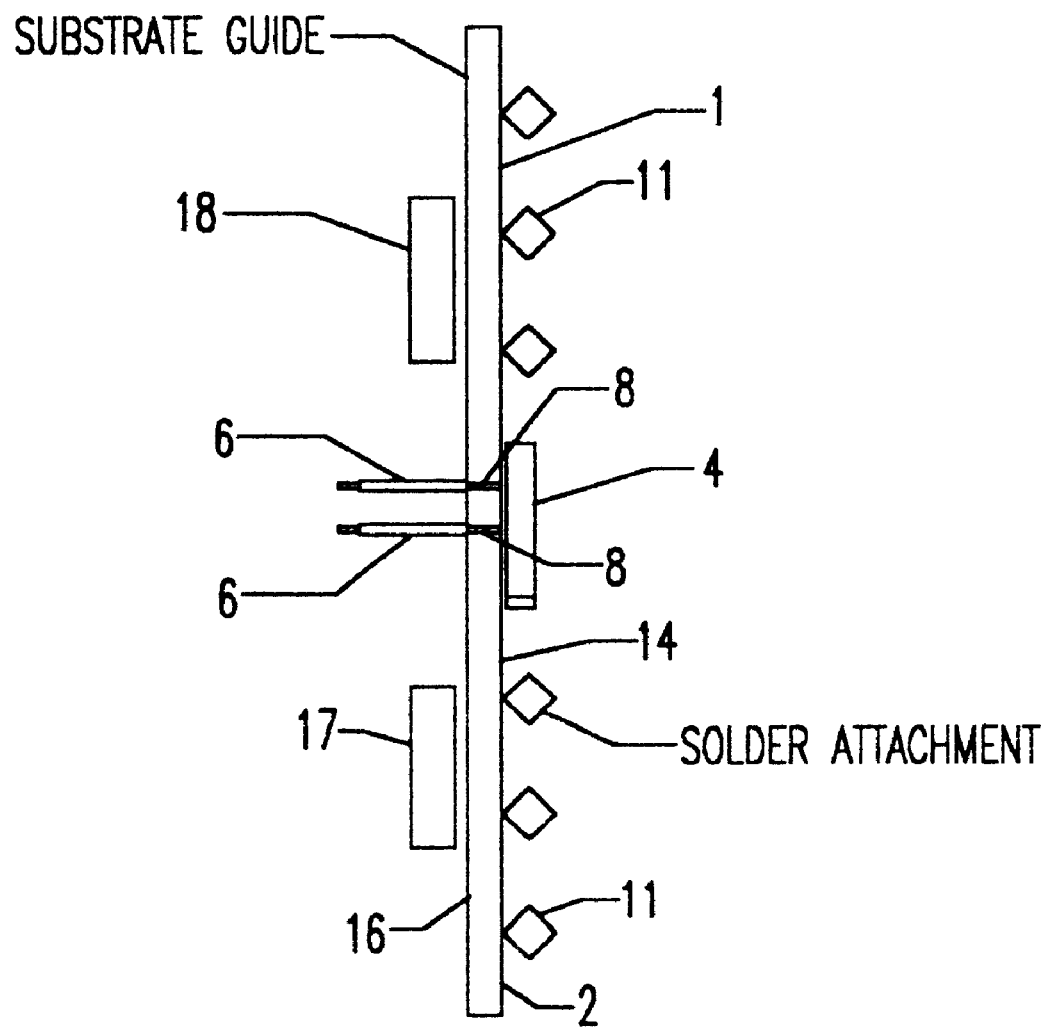
FIG. 1 is a profile view of a preferred embodiment of the optical fiber guide module of the present invention.
Figure 2:
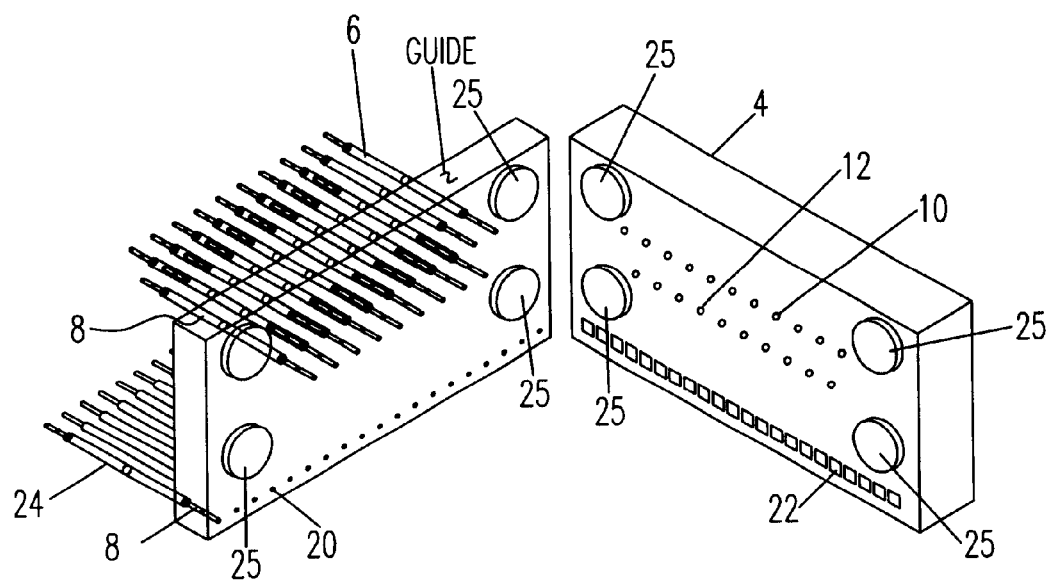
FIG. 2 is another view of the optical fiber guide of the present invention.

Referring to FIGS. 1 and 2, an optical fiber guide 1 in accordance with a preferred embodiment of the present invention includes a substrate 2, an optical chip 4, and a plurality of optical fibers 6. Substrate 2 has at least one hole of a diameter sufficient to pass a beam of light. Preferably, the substrate includes a plurality of holes 8 arranged in the form of a matrix which is easily scalable to any desired dimension. The substrate may also contain one or more BGA solder joint attach points 11 for mounting the substrate onto a card or board.

Use of a matrix of holes is preferable because it increases the density of connections achievable by the fiber guide of the invention compared with conventional optical connectors. Also, by forming the holes directly into the substrate, the invention couples the optical fibers and chip using an efficient one-piece design. This, in turn, substantially reduces the size of the fiber guide compared with conventional connector while simultaneously maintaining a comparatively higher density of connections.

Optical chip 4 may be a vertical cavity surface emitting laser (VCSEL) chip equipped with a plurality of optical transmitters 10 and optical receivers 12. The optical chip is mounted on one side 14 of the substrate at a position which aligns the optical transmitters and receivers with the matrix of holes. The optical transmitters are arranged along one row of the matrix and the optical receivers along another row of the matrix. Preferably, the substrate has built-in circuits for activating the optical chip once mounted onto the substrate.

Optical fibers 6 are connected to the matrix of holes from the opposite side 16 of the substrate. Preferably, the fibers are pushed through the holes entirely and then later polished back flush with the substrate surface. Alternatively, the fibers may be partially connected within the holes, the remainder of which may be occupied by air or one of a plurality of encapsulants conventionally known in the art. These encapsulants may include, for example, UV curable epoxies or their equivalents such as manufactured by Dymax and Ablestick. These encapsulants reduce the attenuation of light transmission at the interfaces of the surfaces of the fibers and the optical or optoelectronic chip. They also protect these surfaces from contaminants and damage.

The optical fiber guide of the present invention outperforms conventional optical fiber guides not only in terms of its reduced size and increase density of connections, but also as a result of the material from which the substrate is made. In accordance with the invention, this material is one having a coefficient of thermal expansion which is at least similar to that of the optical chip. Plastics, sintered metals, glass ceramics, and alumina demonstrate similar coefficients of thermal expansion and thus may be used.

Selecting ceramic material will advantageously allow the substrate and optical chip to expand and contract by substantially similar amounts, thereby ensuring that the matrix of holes remain aligned with the transmitters and receivers of the optical chip regardless of temperature influences on the fiber guide. The selection of this substrate material is especially desirable when other circuits, and/or the optical chip itself, give off heat which reaches the optical fiber guide. Ceramic establishes a good thermal path for dissipating heat that chips may generate. The combination of semiconductor materials and ceramic substrates has been well known in the electronics industry.

To provide this coincident expansion, the optical chip may, for example, be made of silicon, gallium arsenide, or germanium. The coefficient may vary from $2.7 \times 10^{-6}$ per Celsius degree to $5.8 \times 10^{-6}$ per Celsius degree. Alumina ceramic has a coefficient of $6.7 \times 10^{-6}$ per Celsius degree. Copper and other packaging materials have coefficients of $17 \times 10^{-6}$ per Celsius degree and higher.

Figure 3:
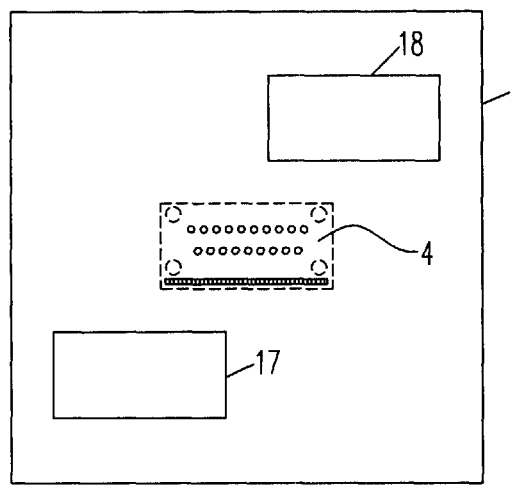
FIG. 3 is a diagram of the optical fiber guide of the present invention modified to include integrated circuit chips.
Figure 4:
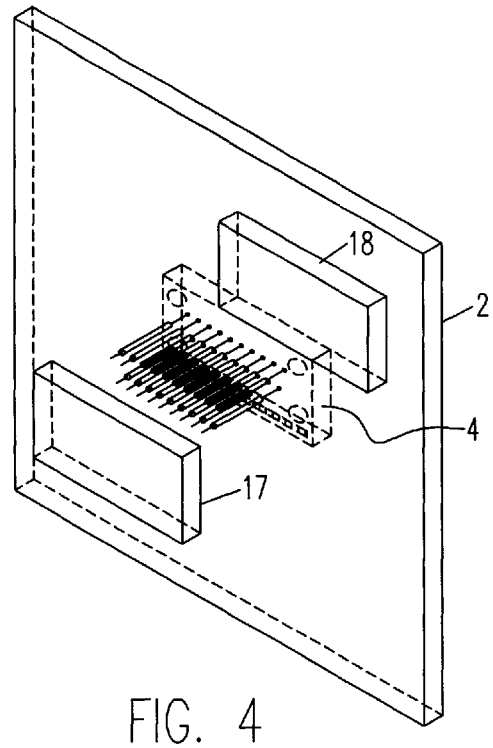
FIG. 4 is another diagram of the optical fiber guide of the present invention modified to include integrated circuit chips.

Referring to FIGS. 1, 3, and 4, in order to increase the functionality of the optical fiber guide of the invention, and the integration density of the overall device in which the guide is incorporated, one or more integrated circuit chips 17 and 18 may be mounted on the substrate. The integrated circuit chips may be non-optical chips such as driver chips, receiver amplifiers, logic chips, microprocessor, and modulator chips to name a few.

Figure 5:
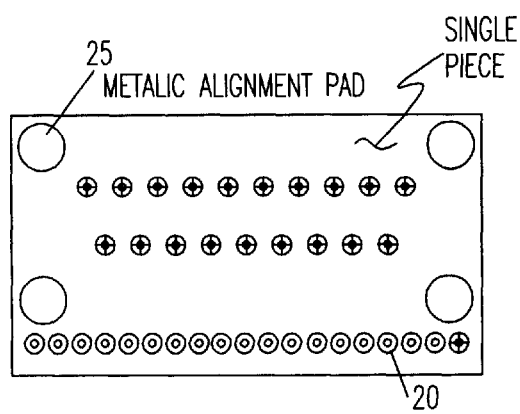
FIG. 5 is an exploded view of a portion of the substrate included in the optical fiber guide of the present invention.
Figure 6:
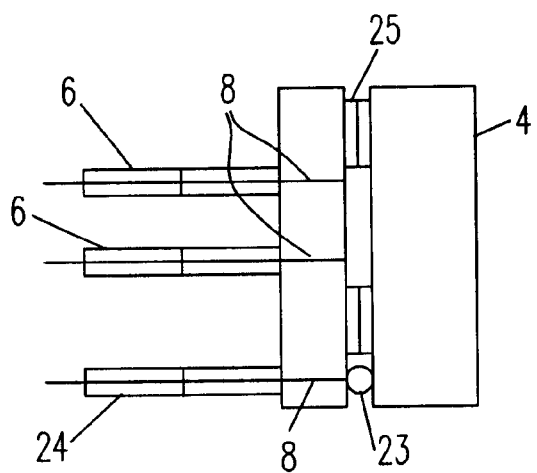
FIG. 6 is a profile view of the optical fiber guide of the present invention modified to accommodate power and/or ground lines.
Figure 7:
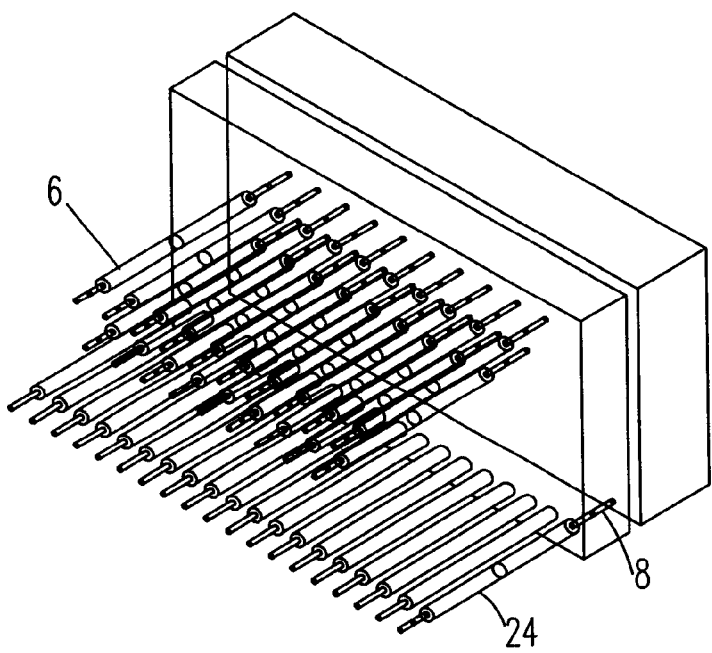
FIG. 7 is another view of the optical fiber guide of the present invention modified to accommodate power and/or ground lines.

Optionally, as shown in FIGS. 2 and 5, the substrate may include a plurality of guide holes 8 with different types of the metallic pads 20 for power lines or for ground lines 24. The optical chip may be mounted on the substrate in such a manner as to also align metallic pads 20 with metallic pads 22 formed adjacent the matrix of optical transmitters and receivers. As shown in FIGS. 6 and 7, power lines and/or ground lines 24 are connected to pads 20. Subsequently, pads 20 are connected to pads 22 through a metallic connection (e.g., solder ball) 23. Through these enhancements, the functionality of the substrate may be increased, i.e., the substrate may be used not only to align the optical fibers with the optical chip but also to carry the electrical signals and power.

Figure 8:
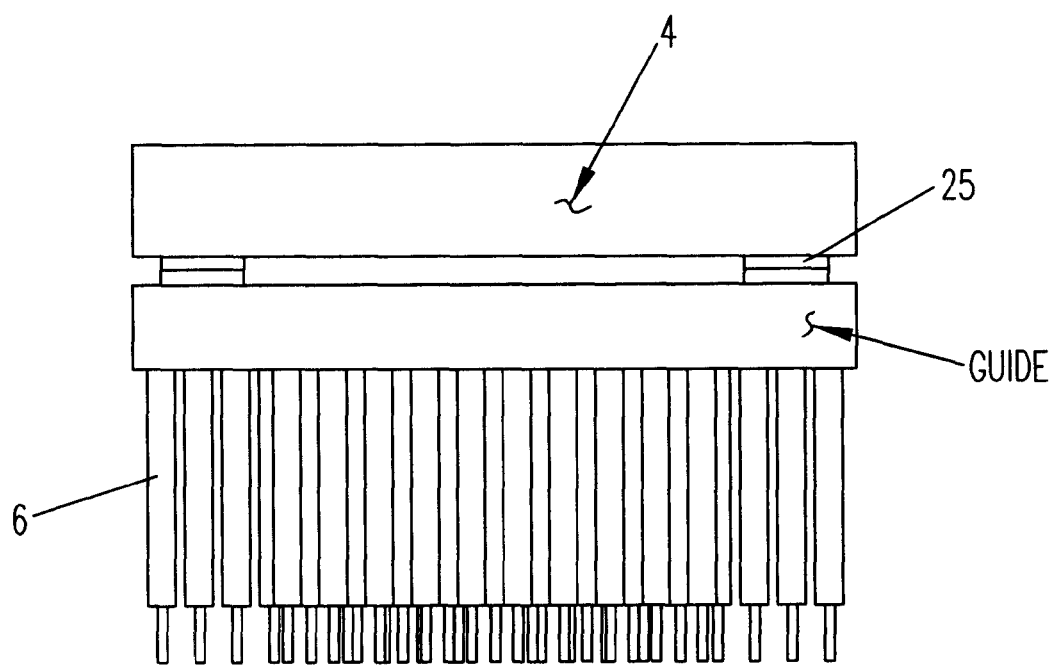
FIG. 8 is a top view of the optical fiber guide of the present invention.

As shown in FIGS. 1, 2, and 8, side 14 of the substrate on which the optical chip is mounted may contain any of a variety of attachments for connecting the substrate to a board or other circuit component, e.g., one containing a processor for processing the optical signals output from the optical chip. The substrate may, for example, include solder bumps 11 for establishing this connection, Alternatively, an adhesive or metallic alignment pads 25 may be placed on side 14 for attaching the substrate, Still further, a combination of these attachments substances or devices may be used.

While the foregoing embodiments have been described as including an optical chip with multiple transmitters and receivers mounted onto a ceramic substrate, those skilled in the art can appreciate that the optical chip may be any other type of optical chip. For example, optical chip 4 may be a type having only one optical transmitter or receiver. In the case where the optical chip has only one optical receiver, the fiber guide of the present invention may, for example, be incorporated within an optical sensor where optical signals received by chip 4 are used to determine whether some physical condition exists. In this case, the ceramic substrate may include only one hole for aligning an optical fiber carrying the optical signal and an optical emitter/receiver in the chip. Advantageously, because the substrate is cade of ceramic which has a coefficient of expansion similar to that of the optical chip, the fiber and chip will not become misaligned when the fiber guide is heated by an external heat source.

The optical fiber guide of the present invention may also be used or adapted to many connector applications. One particularly advantageous application is in the communications field, such as the transmission of voice, data, and/or video where long-distance telecommunications, local area networks (LANs), avionics, industrial controls, and military command and controls are involved, Other applications may also be apparent to those skilled in the art.

Figure 9:
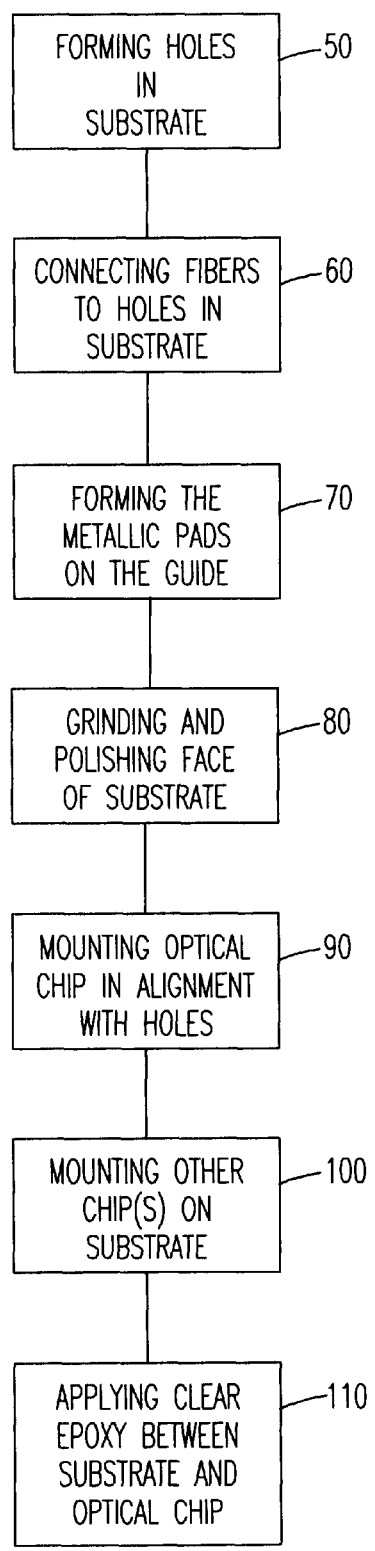
FIG. 9 is a flow diagram showing steps included in a preferred embodiment of the method of the present invention for making an optical fiber guide.

Referring to FIG. 9, a preferred embodiment of the method of making an optical fiber guide module in accordance with the present invention includes, as an initial step, forming one or more holes 8 in substrate 2 for optical fibers and for power wires (guide holes).(Block 50). If multiple holes are formed, the holes may be arranged in a one-dimensional array or a multi-dimensional array such as the matrix of holes 8. These holes may be formed using any conventionally known technique. For example, the holes may be etched into the substrate using lithographic or mechanical techniques or may be formed at the time the substrate is made. In this latter case, the substrate may be molded around a matrix of pins. The pins would then be retracted, leaving the matrix of holes 8 which ultimately serve to optically couple the optical fibers of the invention with the transmitters and receivers of the optical chip.

A second step includes connecting the optical fibers 6 to the matrix of holes in the substrate. (Block 60). This connection may be made by first preparing the ends of the fibers for connection. This preparation may include removing the protective coating on each of the fibers to expose the core. The cores may then be connected to the matrix of holes either by friction fit or by other conventional techniques.

At least one other approach may be taken. Each optical fiber is made from a core, cladding, and outer coating. The core and outer coating of the optical fibers have very precisely controlled diameters. For this reason, the cladding may be removed when building the fiber guide, The size of the holes is the substrate are also very tightly controlled. In making the connection, a coating of adhesive may be applied before inserting the cladded fibers into the holes. The holes have a small amount of clearance to accommodate the adhesive. The fibers are inserted into the holes with their ends protruding from the surface of the substrate.

After all optical fibers and wires are inserted into the holes the process of forming of pads by flashing the ends of fibers or wires on opposite side of the guide is accomplished. (Block 70)

After all fibers have been inserted and the process of forming of alignment pads is completed, a fourth step involves grinding and polishing the ends of the fibers to make them flush with the face of the substrate. (Block 80). As a result, the fibers have all their ends flush with the surface of the substrate and in alignment with the optical chip after mounting.

A fifth step includes mounting optical chip 4 on the substrate in a position which aligns the optical receivers and/or transmitters of the chip with the matrix of holes. (Block 90). This may be accomplished in various ways. One way involves using a flip-chip mounting technique, where metallic alignment pads 25 in the form of solder bumps are formed on a surface of the optical chip and on the surface of the substrate at positions adjacent the matrix of holes. The solder bumps may be placed at these precise positions, for example, using known lithography techniques. After heat is applied, the chip is advanced towards the substrate. When this occurs, the chip self aligns with the substrate through surface tension that forms between the solder bumps on the chip and substrate.

An optional sixth step of the method includes mounting integrated circuit chips 17 and 18 on the substrate. (Block 100). These chips may be mounted by conventional techniques which include electrically connecting the chips to circuitry within or on the substrate for communication with the optical chip, one or more off-substrate chips, or both.

A final step involves applying an optically clear epoxy between the substrate and the optical chip. (Block 110). This under fill material aids in attenuation of the beam as well as protects the optical chip and fiber ends from contaminants.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. For example, those skilled in the art can appreciate that the steps of the method of the present invention may, if desired, be performed in a different order.

We claim:

1. An optical fiber guide module, comprising:
   an optical chip;
   a substrate;
   alignment pads on each of said optical chip and said substrate which are spaced apart in two dimensions so as to provide symmetrical aligning of said optical chip to said substrate;

at least one optical fiber extending through at least one hole in said substrate;

a line of solder bumps positioned on at least one edge of one of said optical chip and said substrate;

a line of guides positioned on at least one edge of one of said optical chip and said substrate;

at least one optical receiver or optical transmitter positioned on said optical chip, said at least one optical receiver or optical transmitter being aligned with said optical fiber by said alignment pads, said line of solder bumps, and said line of guides.

2. The optical fiber guide module of claim 1, wherein said substrate includes a plurality of holes arranged in the form of a matrix in accordance with plurality of said optical receivers and transmitters on the said optical chip, wherein the mounting position of said optical chip aligns a plurality of optical receivers and a plurality of optical transmitters of said optical chip with respective ones of said plurality of holes in said substrate, and wherein said module further includes a plurality of optical fibers connected to respective receivers or transmitters extending entirely within said plurality of holes in said substrate.

3. The optical fiber guide module of claim 1, further comprising:

at least one integrated circuit chip mounted to said substrate.

4. The optical fiber guide module of claim 3, wherein said optical chip and said at least one integrated chip are mounted on different sides of said substrate.

5. The optical fiber guide module of claim 1, wherein an adhesive is used for protection of said optical chip from contaminants.

6. The optical fiber module of claim 1, wherein said optical chip is a Vertical Cavity Surface Emitting Laser (VCSEL) chip, equipped with a plurality of optical transmitters and optical receivers formed in a marrix.

7. The optical fiber guide module of claim 1, wherein said substrate is made from one of plastics, glass ceramics, sintered metal, and alumina.

8. The optical fiber guide module of claim 1, wherein said substrate is made of a material with the a coefficient of thermal expansion same as the material of said optical chip.

9. The optical fiber guide module of claim 1 wherein said substrate is a ceramic.

10. A method for making an optical fiber module, comprising the steps of:

forming at least one hole in a substrate;

securing an optical fiber within said at least one hole;

providing an optical chip with at least one of an optical receiver and an optical transmitter;

forming metallic alignment pads on each of said optical chip and said substrate which are spaced apart in two dimensions so as to provide symmetrical aligning of said optical chip to said substrate;

mounting said optical chip on said substrate at a position which aligns one of an optical receiver and an optical transmitter of said optical chip with the at least one hole in said substrate using a flip-chip soldering technique, which includes the following procedures:

forming a line of solder bumps on at least one edge of one surface of one of said substrate and said optical chip;

forming a line of guides on at least one edge of one surface of one of said substrate and optical chip;

bringing the line of solder bumps into contact with the line of guides while simultaneously applying heat sufficient to melt solder bumps, whereby surface tension of melting solder bumps between said substrate and optical chip self-aligns the at least transmitters and receivers on the said optical chip with the at least one hole in said substrate.

11. The method of making optical fiber module of claim 10, wherein the step of forming said at least one hole forms a plurality of holes, arranged in the form of a matrix, in said substrate and wherein said step of securing connects a plurality of optical fibers to respective ones of said plurality of holes in said substrate.

12. The method of claim 10, further comprising mounting at least one integrated circuit chip to a side of said substrate opposite to the side having said line of solder bumps are placed.

13. The method of claim 10, wherein said metallic alignment pads are Ball Grid Array (BGA) solder joint attach points.

14. The method of claim 11, further comprising step of:

connecting at least one of power lines and ground lines to one end of at least one of said plurality of guide holes.

15. The method of claim 10, further comprising the step of:

applying an adhesive between said optical chip and substrate for protection of said: optical chip from contaminants.

16. The method of claim 1, wherein said optical chip is a Vertical Cavity Surface Emitting Laser (VCSEL) chip, equipped with a plurality of optical transmitters and optical receivers formed in a matrix.

17. A method for making an optical fiber module, comprising the steps of:

providing an optical fiber guide module comprising:

an optical chip;

a substrate;

alignment pads on each of said optical chip and said substrate which are spaced apart in two dimensions so as to provide symmetrical aligning of said optical chip to said substrate;

at least one optical fiber extending through at least one hole in said substrate; a line of solder bumps positioned on at least one edge of one of said optical chip and said substrate;

a line of guides positioned on at least one edge of one of said optical chip and said substrate;

at least one optical receiver or optical transmitter positioned on said optical chip, said at least one optical receiver or optical transmitter being aligned with said optical fiber by aligning said alignment pads and by joining said line of solder bumps with said line of guide; and bringing the line of solder bumps into contact with said line of guides while simultaneously applying heat sufficient to malt solder bumps, whereby surface tension of malted solders between said substrate and optical chip from melting solder bums self-aligns the transmitters and receivers on the said optical chip with the holes in said substrate.

18. The method for making an optical fiber module as recited in claim 17, further comprising a step of:

forming a guide hole foe a power wire in at least one edge of one surface of the said substrate.

* * * * *